US010289647B2

(12) United States Patent
Li et al.

(10) Patent No.: US 10,289,647 B2
(45) Date of Patent: May 14, 2019

(54) RECOMMENDING PAGES OF CONTENT TO AN ONLINE SYSTEM USER BY IDENTIFYING CONTENT FROM RECOMMENDED PAGES TO THE USER

(71) Applicant: Facebook, Inc., Menlo Park, CA (US)

(72) Inventors: Meiying Li, Bellevue, WA (US); Jason Eric Brewer, Kirkland, WA (US); Bradley Ray Green, Snohomish, WA (US)

(73) Assignee: Facebook, Inc., Menlo Park, CA (US)

( * ) Notice: Subject to any disclaimer, the term of this patent is extended or adjusted under 35 U.S.C. 154(b) by 651 days.

(21) Appl. No.: 14/980,439

(22) Filed: Dec. 28, 2015

(65) Prior Publication Data

US 2017/0185683 A1  Jun. 29, 2017

(51) Int. Cl.
*G06F 3/0483* (2013.01)
*G06F 16/9535* (2019.01)
*G06F 3/0485* (2013.01)
*H04L 29/08* (2006.01)
*G06F 17/21* (2006.01)

(52) U.S. Cl.
CPC ........ *G06F 16/9535* (2019.01); *G06F 3/0483* (2013.01); *G06F 3/0485* (2013.01); *G06F 17/212* (2013.01); *H04L 67/306* (2013.01); *H04L 67/02* (2013.01)

(58) Field of Classification Search
CPC .... G06F 3/0483; G06F 3/0485; G06F 17/212; G06F 17/30867; H04L 67/306
See application file for complete search history.

(56) References Cited

U.S. PATENT DOCUMENTS

| | | | | |
|---|---|---|---|---|
| 2009/0158147 | A1* | 6/2009 | Amacker | G06F 9/451 715/700 |
| 2012/0278742 | A1* | 11/2012 | Takami | G06Q 30/02 715/760 |
| 2014/0372951 | A1* | 12/2014 | Li | G06F 17/30 715/835 |
| 2015/0169744 | A1* | 6/2015 | Walkingshaw | G06Q 30/0251 707/738 |

* cited by examiner

*Primary Examiner* — Anil K Bhargava
(74) *Attorney, Agent, or Firm* — Fenwick & West LLP (57) ABSTRACT

An online system, such as a social networking system, recommends pages of content to users. The recommendation is presented in a recommendation unit presenting one or more representations of pages to a user. Additionally, the user may interact with the recommendation unit to change representations of pages presented by the recommendation unit. A representation of a page presented by the recommendation unit includes content from one or more content items on the page selected based on interaction with the content items on the page and types of content included in content items on the page (e.g., image data, video data, destination address). Representations of different pages may differ based on the types of content included in content items selected from the different pages.

21 Claims, 3 Drawing Sheets

RECOMMENDING PAGES OF CONTENT TO AN ONLINE SYSTEM USER BY IDENTIFYING CONTENT FROM RECOMMENDED PAGES TO THE USER

BACKGROUND

This disclosure relates generally to online systems, and more specifically to recommending content to a user of an online system.

Online systems, such as social networking systems, allow users to connect to and communicate with other users of the online system. Users create profiles on an online system that are tied to their identities and include information about the users, such as interests and demographic information. The users may be individuals or entities such as corporations or charities. Because of the increasing popularity of online systems, and the significant amount of user-specific information maintained by online systems, an online system allows users to easily communicate information about themselves to other users and share content with other users.

Many online systems maintain pages of content associated with different users, allowing a user to view content provided by an additional user or associated with the additional user by accessing the page maintained for the additional user. For example, businesses or users maintain pages on an online system and provide content items to the page for presentation to online system users. An online system may allow a user to establish a connection to a page maintained for another user and subsequently notify the user when content is provided to the page maintained for the other user. This allows a user to more easily distribute content to other users who are connected to a page maintained by the online system for the user.

An online system may maintain a large number of pages associated with various users. While this allows the online system to provide its users with a variety of content, maintaining a large number of pages makes it more difficult for users to identify pages including content of interest to the user. Difficulty identifying pages including content of interest to the user may decrease the amount of interaction with the online system.

SUMMARY

An online system maintains pages associated with various users of the online system. A user provides content items to a page associated with the user, allowing other online system users to access the content items by accessing the page. For example, a page associated with a user includes a feed of content items provided to the page by the user that is presented to other users who access the page. Content items included on a page by the user may include different types of content. Example types of content include: video data, image data, audio data, text data, and a destination address for obtaining content internal to or external to the online system. The online system maintains an identifier for the page and associates identifiers of content items provided to the page with the identifier for the page to indicate content items provided to the page.

Users of the online system may establish a connection to a page associated with a user by performing one or more interactions with the page. The online system communicates information identifying content items provided to a page to users who have established a connection to the page, allowing users connected to the page to more easily identify content provided to the page. To allow the user to more easily identify pages including content items in which the user is likely to have an interest, the online system identifies a set of pages based at least in part on characteristics of the user. For example, the online system identifies pages associated with a topic matching an interest specified in a user profile of the user or identifies pages connected to additional users who are connected to the user. As another example, the online system identifies pages associated with a topic matching a topic of a page connected to the user.

The online system selects one or more content items included on each page in the set. Content items included on a page are selected based on types of content included in the content items and amounts of interaction with the content items. In various embodiments, for a page in the set, the online system identifies a set of content items included on the page that include one or more specific types of content and selects content items from the set of content items based on amounts of interaction with content items in the set of content items. For example, the online system identifies a set of content items included on a page that includes one or more of: image data, video data, and a destination address. The online system may determine a score for each content item in the set based on amounts of user interaction with a content item, such as a number of specific interactions with the content item or a number of unique users who performed one or more specific interactions with the content item. Based on the scores, the online system selects one or more of the content items included on the page. For example, the online system selects content items from the set having at least a threshold score or ranks content items in the set based on their scores and selects content items having at least a threshold position in the ranking. Hence, the online system selects one or more content items from each page in the set.

Based on the one or more content items selected from each page in the set, the online system generates a representation of each page in the set. A representation of a page includes content from one or more of the content items selected from the page, allowing the user to quickly identify content that is included on the page, providing the user with more information when determining if the page is of interest to the user. The representation of a page may be based on types of content included in content items selected from the page. For example, the representation of a page includes images from a multiple content items selected from the page that include image data. As another example, the representation of a page includes video data from a content item selected from the page including video data. In another example, the representation of a page includes a destination address from a content item selected from the page that includes the destination address. In some embodiments, if the content items selected from a page do not include at least one content item having at least one specific type of content, the representation of the page is generated from image data associated with the page by the online system, such as a profile image or other image associated with the page itself by the online system.

To allow the user to more easily identify the set of pages, the online system generates a scrollable recommendation unit including the representations of the pages in the set. The scrollable recommendation unit includes a display area for displaying fewer than all of the representations of pages in the set of pages at a time and is associated with one or more interactions for modifying at least one representation of a page presented in the display area. Hence, the interactions associated with the scrollable recommendation unit allow the user to navigate through the representations of pages in the set by presenting different representations of pages in the display area. The online system presents the scrollable recommendation unit to the user to identify the pages in the set to the user. In some embodiments, the online system includes the scrollable recommendation unit in a feed of content selected for the user by the online system. For example, the scrollable recommendation unit is included in a vertically-oriented feed of content items and is horizontally scrollable to present additional representations of pages from the set of pages in the display area as the user interacts with the scrollable recommendation unit (e.g., when a user performs a horizontal gesture with a portion of a display device presenting the scrollable recommendation unit). As another example, the scrollable recommendation unit is presented proximate to the vertically-oriented feed of content but outside of the vertically-oriented feed of content.

Additionally, the scrollable recommendation unit is associated with one or more interactions allowing the user to interact with a page corresponding to a representation of the page presented in the display area. For example, the scrollable recommendation unit is associated with an interaction allowing the user to indicate a preference for the page corresponding to the representation of the page presented in the display area, which establishes a connection between the user and the page corresponding to the representation of the page presented in the display area. For example, the scrollable recommendation unit includes an interface element in the display area proximate to the representation of the page, allowing the user to indicate a preference for the page corresponding to the representation by interacting with the interface element. If the user indicates a preference for the page corresponding to the representation of the page presented in the display area, the online system includes one or more additional pages having characteristics matching characteristics of the page corresponding to the representation of the page presented in the display area in the set and generates representations of the additional pages (e.g., additional pages associated with a topic matching a topic associated with the page corresponding to the representation). As described above, the online system generates a representation of an additional page by identifying content items from the additional page based on types of content included in the content items on the additional page and interactions with content items on the additional page by online system users and generating the representation based on content included in the identified content items on the additional page. The online system includes the representations of the one or more additional pages in the scrollable recommendation unit to identify the additional pages to the user.

As another example, the scrollable recommendation unit is associated with an interaction or includes an interface element allowing the user to remove a representation of a page in the set of pages from presentation in the display area of the scrollable recommendation unit. For example, an interface element is presented in the display area along with the representation of the page, and the representation of the page is removed from the scrollable recommendation unit if the user accesses the interface element. When the representation of the page is removed from the scrollable recommendation unit, the online system removes the page corresponding to the representation from the set of pages and modifies the scrollable recommendation unit to present a representation of another page from the set of pages in the display area.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
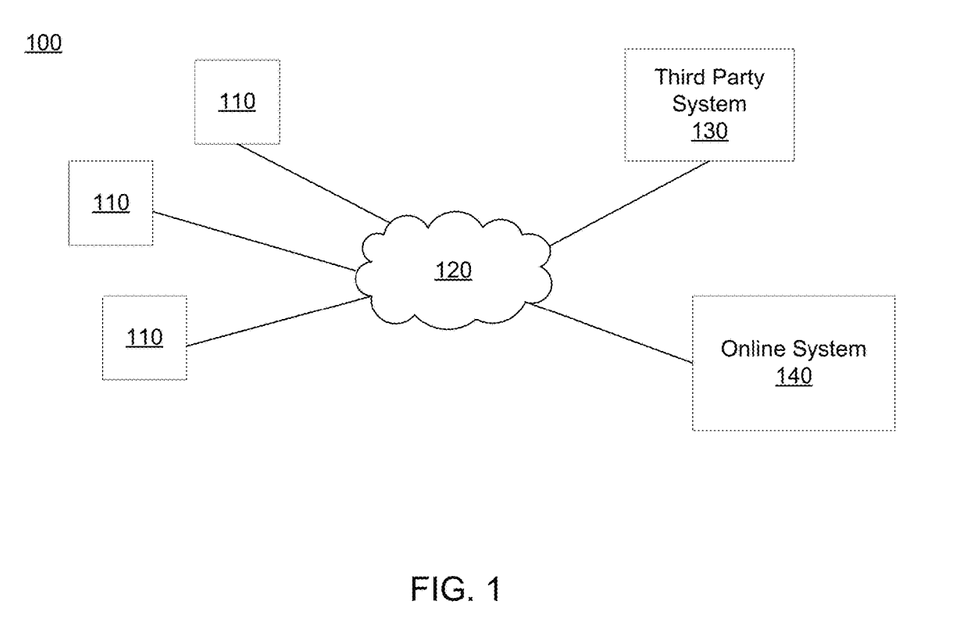
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. The online system 140 may be a social networking system, a content sharing network, or any other system providing content to its users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device 110. In other embodiments, a third party system 130 provides content or other information for presentation via a client device 110. A third party system 130 may also communicate information to the online system 140, such as advertisements, content, or information about an application provided by the third party system 130.

Figure 2:
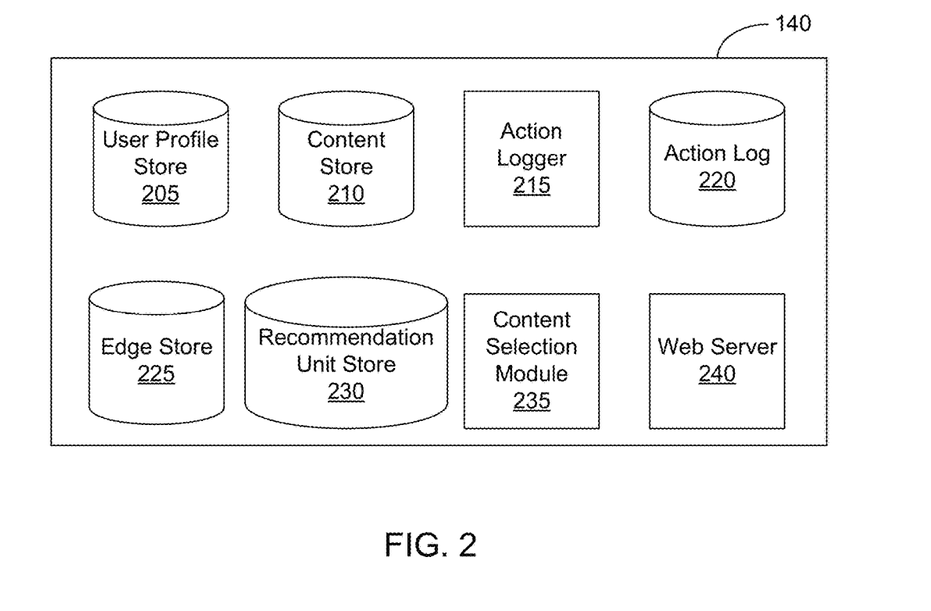
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a recommendation unit store 230, a content selection module 235, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a page associated with the entity's user profile. Other users of the online system 140 may connect to the page to receive information posted to the page or to receive information from the page. A user profile associated with the page may include information about the entity itself, providing users with background or informational data about the entity. In some embodiments, the page associated with the entity's user profile may retrieve information from one or more user profiles associated with user who have interacted with the page or with other content associated with the entity, allowing the page to include information personalized to a user when presented to the user.

The content store 210 stores objects that each represent various types of content. Examples of content represented by an object include a page post, a status update, a photograph, a video, a link, a shared content item, a gaming application achievement, a check-in event at a local business, a page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

Pages associated with various users may be maintained by the content store 210, which may associate an identifier of a page with an identifier of user associated with the page or with a user profile of the user associated with the page. The user provides content items to the page associated with the user, and the online system 140 presents the content items to other users via the page. For example, the page includes a feed of content presenting content items provided to the page, so other users of the online system 140 may view the content items provided to the page by accessing the page. In some embodiments, additional users may provide content items to a page associated with the user, which presents the content items provided by the additional users. A page is associated with a title and may include additional content, such as one or more images presented by the page (e.g., a profile image, an image presented in a portion of the page when the page is presented to users), or other information identifying or describing the page.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, indicating a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. For example, if a user indicates a preference for a page included in the content store 210, a connection between the user and the page is generated and identified by information in the edge store 225 identifying the user and the page.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or a particular user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The online system 140 may provide one or more recommendation units to its users to increase user interaction with the online system 140. Recommendation units are included in the recommendation unit store 230 and various embodiments. A recommendation unit suggests one or more actions to a user viewing the recommendation unit to increase the user's interaction with the online system. For example, a recommendation unit provides a suggestion for the user to establish a connection with another user as well as a link enabling the user to do so. As another example, a recommendation unit identifies one or more pages maintained by the online system 140 and instructions for the user to establish connections to one or more of the pages. In other examples, a recommendation unit encourages the user to invite an additional user to an event, to identify another user in a photo, to join a group, or to perform another suitable action with the online system 140. Each recommendation unit is associated with a score based on a value of the viewing user interacting with the recommendation unit (i.e., "converting" the recommendation unit by performing the recommended action) and/or on the likelihood that the viewing user will convert the recommendation unit. The score may be based on prior interaction with recommendation units by the viewing user, other users to whom the viewing user is connected, a probability of the viewing user interacting with the recommendation unit, or other criteria. Determination of a score for a recommendation unit is further described in U.S. patent application Ser. No. 13/549,080, filed on Jul. 13, 2012, which is hereby incorporated by reference in its entirety. The content selection module 235, further described below, selects one or more recommendation units for presentation to a user based at least in part on scores associated with various recommendation units in the recommendation unit store 230.

The content selection module 235 selects one or more content items for communication to a client device 110 to be presented to a user. Content items eligible for presentation to the user are retrieved from the content store 210, from recommendation unit store 230, or from another source by the content selection module 235, which selects one or more of the content items for presentation to the user. In various embodiments, a content item eligible for presentation to the user is a content item associated with another user or associated with an object to which the user is connected via the online system 140. The content selection module 235 includes content items eligible for presentation to the user in one or more selection processes, which identify a set of content items for presentation to the user. For example, the content selection module 235 determines measures of relevance of various content items to the user based on characteristics associated with the user by the online system 140 and based on the user's affinity for different content items. Information associated with the user and included in the user profile store 205, in the action log 220, and in the edge store 225 may be used to determine the measures of relevance. Based on the measures of relevance, the content selection module 235 selects content items for presentation to the user. As an additional example, the content selection module 235 selects content items having the highest measures of relevance or having at least a threshold measure of relevance for presentation to the user. Alternatively, the content selection module 235 ranks content items based on their associated measures of relevance and selects content items having the highest positions in the ranking or having at least a threshold position in the ranking for presentation to the user.

Content items selected for presentation to the user may include recommendation units to encourage the user to perform additional interactions with the online system 140, such as establishing connections to other users, establishing connections to objects (e.g., pages), or performing any other suitable interaction. The content selection module 235 uses scores associated with recommendation units from the recommendation unit store 230 when selecting content for presentation to the viewing user. Selecting recommendation units for presentation to a user is further described in U.S. patent application Ser. No. 13/549,080, filed on Jul. 13, 2012, and in U.S. patent application Ser. No. 13/247,832, filed on Sep. 28, 2011, each of which is hereby incorporated by reference in its entirety. In some embodiments, the content selection module 235 generates a feed of content for presentation to a user and allocates one or more positions in the feed for presenting recommendation units to the user.

For example, the content selection module 235 receives a request to present a feed of content to a user of the online system 140. The feed may include one or more recommendation units and content items, such as stories describing actions associated with other online system users connected to the user. The content selection module 235 accesses one or more of the user profile store 205, the content store 210, the action log 220, and the edge store 225 to retrieve information about the user. For example, content items or other data associated with users connected to the user are retrieved. Additionally, one or more recommendation units may be retrieved from the recommendation unit store 230. The retrieved content items and recommendation units are analyzed by the content selection module 235 to identify candidate content that is likely to be relevant to the identified user. For example, content items associated with users not connected to the user or content items associated with users for whom the user has less than a threshold affinity are discarded as candidate content. Based on various criteria, the content selection module 235 selects one or more of the content items or recommendation units identified as candidate content for presentation to the identified user. The selected content items or recommendation units are included in the feed of content that is presented to the user.

Hence, in various embodiments, the content selection module 235 presents content to a user through a feed including a plurality of content items selected for presentation to the user. One or more advertisements may also be included in the feed. The content selection module 235 may also determine an order in which selected content items or recommendation units are presented via the feed. For example, the content selection module 235 orders content items or recommendation units in the feed based on likelihoods of the user interacting with various content items or recommendation units.

When generating a feed of content items for presentation to a user, the content selection module 235 generates one or more scrollable recommendation units for inclusion in the feed along with content items in various embodiments. The scrollable recommendation unit includes a display area and a set of information identifying objects maintained by the online system 140. Hence, the scrollable recommendation unit includes information identifying various objects maintained by the online system 140 with which the user may interact. For example, the scrollable recommendation unit includes a display area and a set of information representing different pages maintained by the online system 140. One or more user interactions are associated with the scrollable recommendation unit to allow the user to navigate through the set of information identifying objects maintained by the online system 140 by modifying information identifying an object presented in the display area of the scrollable recommendation unit. When a user interacts with the scrollable recommendation unit, information identifying an object maintained by the online system 140 presented in the display area of the scrollable recommendation unit changes to information identifying another object maintained by the online system 140 included in the scrollable content unit. In some embodiments, the scrollable recommendation unit scrolls in a direction orthogonal to an orientation of the feed of content item when the user interacts with the scrollable recommendation unit. For example, if the scrollable recommendation unit is presented in a vertically-oriented feed of content items, the scrollable recommendation unit horizontally scrolls through the set of information identifying objects maintained by the online system 140 based on user interactions with the scrollable recommendation unit.

To provide a user with additional information about objects maintained by the online system 140, information in a scrollable recommendation unit identifying an object includes content associated with the object. For example, a scrollable recommendation unit including information identifying various pages maintained by the online system 140 includes representations of the pages, with a representation of a page based on content provided to the page. Presenting content from page in the representation of the page allows the user to more accurately determine if the page is of interest to the user from the scrollable recommendation unit. In various embodiments, the content selection module 235 selects one or more content items from a page based on types of content included in content items on the page and amounts of interaction with the content items included on the page. For example, the content selection module 235 identifies content items on the page including video data, image data, or a destination address, and selects one or more of the identified content items based on amounts of interaction with each identified content item by online system users. The content selection module 235 generates a representation of the page based on content from one or more of the selected content items and includes the representation of the page in the scrollable recommendation unit. For example, the representation of the page is image data retrieved from a set of the content items selected from the page or is video data retrieved from a content item selected from the page. Generation of the scrollable recommendation unit and generation of representation of pages included in the scrollable recommendation unit are further described below in conjunction with FIGS. 3 and 4.

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, WEBOS® or BlackberryOS.

Figure 3:
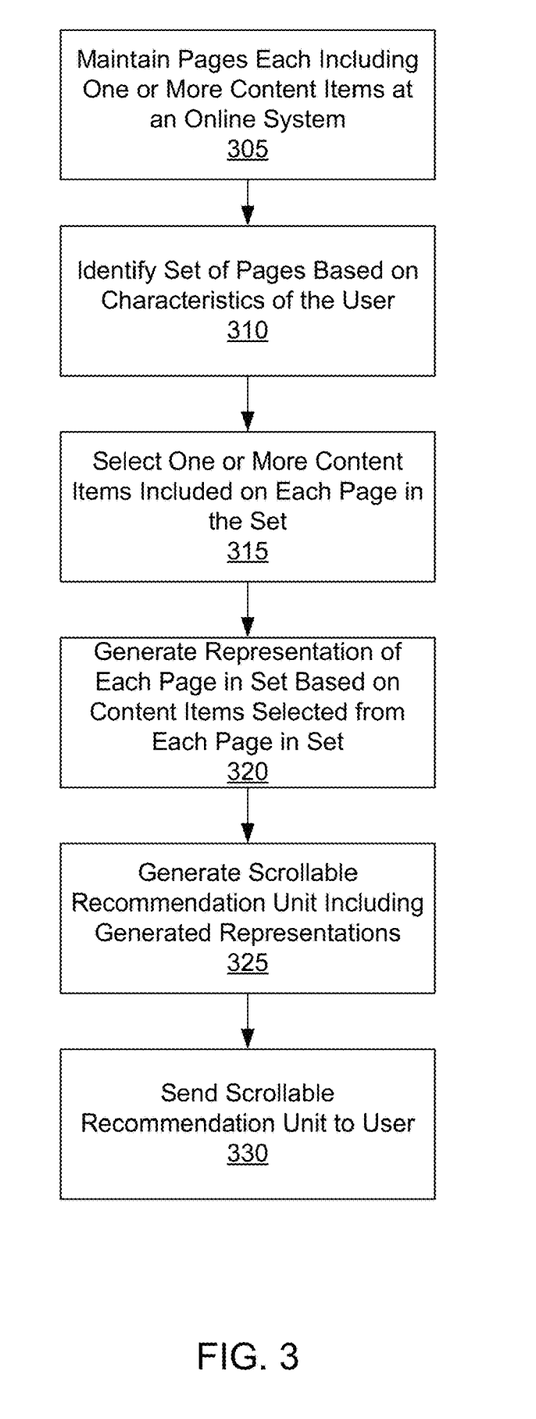
FIG. 3 is a flowchart of a method for presenting representations of pages of content to an online system user, in accordance with an embodiment.

Identifying Pages Maintained to an Online System User Via a Scrollable Recommendation Unit FIG. 3 is a flowchart of one embodiment of a method for presenting representations of pages of content to a user of an online system 140 via a scrollable recommendation unit. In other embodiments, the method may include different and/or additional steps than those shown in FIG. 3. Additionally, steps of the method may be performed in different orders than the order described in conjunction with FIG. 3 in various embodiments.

An online system 140 maintains various pages associated with users of the online system 140. A user provides content items to a page associated with the user, and the online system 140 presents the provided content items to users via the page, allowing users to access the content items by accessing the page. The online system 140 associates identifiers of content items provided to a page with an identifier of the page, and retrieves content items corresponding to the identifiers when the page is presented to a user. For example, a page associated with a user includes a feed of content items provided to the page by the user, or by other users. When a user accesses the page, the feed of content items is presented to the user. Content items included on the page by the user may include different types of content. Example types of content include: video data, image data, audio data, text data, and a destination address for obtaining content internal to or external to the online system 140. A content item may include multiple types of content or may include a single type of content.

Users of the online system 140 may establish a connection to a page associated with a user by performing one or more interactions with the page. For example, the online system 140 establishes a connection between a user and a page when the user indicates a preference for the page. In various embodiments, the online system 140 communicates information identifying content items provided to a page to users who are connected to the page, allowing users connected to the page to more easily identify content provided to the page. For example, the online system 140 includes content items provided to the page in one or more selection processes generating a feed of content for the user, so content items provided to the page may be included in the feed of content presented to the user.

To allow a user to more easily identify pages including content items of interest to the user, the online system 140 identifies 310 a set of pages based at least in part on characteristics of the user. For example, the online system 140 identifies pages associated with a topic matching an interest specified in a user profile of the user or identifies pages connected to additional users who are connected to the user. A topic associated with a page may be specified by the user associated with the page or may be determined by the online system 140 from content items provided to the page, as further described in U.S. patent application Ser. No. 13/167,701, filed Jun. 24, 2011, which is hereby incorporated by reference in its entirety. As another example, the online system 140 identifies 310 pages associated with a topic matching a topic of another page connected to the user. In another example, the online system 140 identifies 310 pages connected to at least a threshold number of users having characteristics matching characteristics of the user (e.g., location, educational history, gender, age range, etc.). However, the online system 140 may identify 310 the set of pages based on any suitable characteristics.

From each page in the identified set, the online system 140 selects 315 one or more content items included on a page. The online system 140 selects 315 the one or more content items on a page based on types of content included in various content items on the page and amounts of interaction with various content items on the page. For a page included in the set, the online system 140 identifies a set of content items included on the page that include one or more specific types of content. In various embodiments, the online system 140 identifies a set of content items including video data, image data, or a destination address from the page. In various embodiments, the online system 140 maintains rules identifying types of content items to identify from the page. For example, rules maintained by the online system 140 associate different priorities with different types of content or identify a minimum or maximum number of content items including a specific type of content to identify from the page.

For each content item in the set, the online system 140 determines an amount of interaction with a content item and selects 315 content items from the set of content items identified from the page. In various embodiments, the online system 140 determines a score for each content item in the set of content items from the page, with the score for a content item based on a number of one or more specific interactions with the content item or based on a number of unique online system users who performed one or more specific interactions with the content item. For example, the score for a content item is a combination of a number of times users indicated a preference for the content item, a number of times users shared the content item with other users, and a number of comments on the content item. As another example, the score for a content item is a combination of a number of unique users who indicated a preference for the content item, a number of unique users who shared the content item with other users, and a number of unique users who commented on the content item. In some embodiments, the online system 140 associates different weights with different interactions with the content item and applies the weights to numbers of the different interactions or to numbers of unique users who performed different interactions, so a score for a content item on the page is a weighted combination of the different interactions with the content item or a weighted combination of the number of unique users who performed different interactions with the content item. For example, a weight associated with commenting on a content item is higher than a weight associated with indicating a preference for the content item.

In various embodiments, the online system 140 selects 315 content items from the set of content items identified for a page having at least a threshold score. Alternatively, the online system 140 ranks content items in the set of content items identified for the page based on their scores and selects 315 content items having at least a threshold position in the ranking. Selecting 315 content items included on each page based on types of content included in the content items and interactions with the content items on each page allows the online system 140 to select 315 content items most likely to be of interest to the user.

Based on the one or more content items selected from each page in the set, the online system 140 generates 320 a representation of each page in the set of pages. The representation of a page includes content obtained from one or more of the content items selected from the page, allowing the user to quickly identify content that is included on the page, which enables the user to more easily determine if the page includes content likely to be of interest to the user. In various embodiments, the online system 140 generates 320 a representation of a page in the set of pages based on types of content included in the content items selected 315 from the page. For example, the online system 140 generates 320 a representation of a page including images from multiple content items selected from the page that include image data; in a specific example, the representation of a page includes image data obtained from four content items selected 315 from the page that include image data (e.g., a two-by-two grid of images from four content items including image data selected 315 from the page). As another example, the online system 140 generates 320 a representation of a page including video data from a content item selected from the page that includes video data. In another example, a representation of a page includes a destination address from a content item selected from the page that includes the destination address.

The online system 140 may maintain one or more rules for generating 320 representations of pages and generate a representation of a page based on rules satisfied by content items selected 315 from the page. For example, a rule specifies generation of a representation of a page from image data if at least a threshold number of content items selected 315 from the page include image data, while another rule specifies generation of a representation of a page from video data if at least one content item selected 315 from the page includes video data. Rules maintained by the online system 140 for generating 320 representations of pages may account for amounts of interaction with content items selected 315 from the page as well as types of content included in content items selected 315 from the page. For example, a rule specifies generating 320 a representation of a page from a content item selected 315 from the page that includes video data if an amount of interaction with the selected content item that includes video data exceeds amounts of interaction with content items selected 315 from the page that include image data. As another example, a rule specifies generating 320 a representation of a page from content items selected 315 from the page that include image data if an amount of interaction with a selected content item that includes image data exceeds amounts of interaction with at least a threshold number of selected content items that include video data. In some embodiments, if the content items selected from a page do not include at least a threshold number of content items including at least one specific type of content, the online system 140 generates 320 the representation of the page from image data associated with the page by the online system 140, such as a profile image or other image associated with the page by a user associated with the page. For example, a rule specifies generating 320 a representation of a page from an image associated with the page (e.g., a profile image associated with the page) if less than a threshold number of content items selected 315 from the page include image data and if less than alternative threshold number of content items selected 315 from the page include video data or include a destination address. Different threshold numbers of content items may be associated with different types of content items included in content items selected 315 from pages in various embodiments to modify generation 320 of representations of the pages. Example representations of pages are further described below in conjunction with FIG. 4.

To allow the user to more easily identify the set of identified pages when viewing content, the online system 140 generates 325 a scrollable recommendation unit including the representations of the pages in the set. The scrollable recommendation unit includes a display area for displaying fewer than all of the representations of pages in the set of pages at a time and is associated with one or more interactions for modifying at least one representation of a page presented in the display area. In various embodiments, the scrollable recommendation unit identifies a recommended action for the user to perform with pages corresponding to the representations or with the representations of pages (e.g., text to indicate a preference for pages corresponding to representations presented in the display area). Hence, interactions associated with the scrollable recommendation unit allow the user to navigate through representations of pages in the set by modifying the representations of pages presented in the scrollable recommendation unit's display area. The online system 140 sends 330 the scrollable recommendation unit for presentation the user to identify the pages in the set to the user. In some embodiments, the online system 140 includes the scrollable recommendation unit in a feed of content (or "content feed") selected for the user by the online system 140 and sent 330 to a client device 110 for presentation to the user. For example, the online system 140 includes the scrollable recommendation unit in a vertically-oriented feed of content items sent 330 for presentation to the user; in the preceding example, the scrollable recommendation unit is horizontally scrollable to present additional representations of pages from the set of pages in the display area as the user interacts with the scrollable recommendation unit (e.g., when a user performs a horizontal gesture with a portion of a display device of a client device 110 presenting the scrollable recommendation unit). As another example, the online system 140 sends 330 a feed of content to a client device 110 for presentation to a user and sends 330 the scrollable recommendation for presentation proximate to the feed of content (e.g., adjacent to a vertically-oriented feed of content) but outside of the feed of content. In some embodiments, the scrollable recommendation unit is differently presented when in a feed of content than when proximate to the feed of content. For example, the display area of the scrollable recommendation unit presents multiple representations of pages from the set of pages when the scrollable recommendation unit is presented in the feed of content but presents a single representation of a page from the set of pages when the scrollable recommendation unit is presented proximate to the feed of content.

Additionally, the scrollable recommendation unit is associated with one or more interactions allowing the user to interact with a page corresponding to a representation of the page presented in the display area. In some embodiments, the display area of the scrollable recommendation unit presents one or more interface elements proximate to representations of pages from the set of pages. Additionally or alternatively, the scrollable recommendation unit is associated with various interactions that, when performed by the user, perform interactions with a page corresponding to a representation of a page presented in the display area of the scrollable recommendation unit. For example, the scrollable recommendation unit is associated with an interaction or presents an interface element allowing the user to indicate a preference for a page corresponding to a representation of the page presented in the display area. If the user indicates a preference for the page corresponding to the representation of the page presented in the display area, the online system 140 establishes a connection between the user and the page corresponding to the representation of the page presented in the display area. For example, the scrollable recommendation unit includes an interface element in the display area proximate to the representation of the page, and the user indicates a preference for the page corresponding to the representation by interacting with the interface element. If the user indicates a preference for the page corresponding to the representation of the page presented in the display area, the online system 140 removes the page from the set of pages and includes one or more additional pages having characteristics matching characteristics of the page corresponding to the representation presented in the display area of the scrollable recommendation unit (e.g., additional pages associated with a topic matching a topic associated with the page corresponding to the representation) and generates representations of the additional pages. As further described above, the online system 140 generates a representation of an additional page by identifying content items from the additional page based on types of content included in the content items on the additional page and interactions with content items on the additional page by online system users. A representation of an additional page is generated from content in at least a subset of the identified content. The online system 140 includes the representations of the one or more additional pages in the scrollable recommendation unit to identify the additional pages to the user. Additionally, the online system 140 removes the page to which the user established a connection from the set of pages, which removes the representation of the page from the scrollable recommendation unit to prevent subsequent presentation of the representation of the page to the user. In some embodiments, the online system 140 appends the additional pages to the set of pages.

As another example, the scrollable recommendation unit is associated with an interaction or includes an interface element allowing the user to remove a representation of a page in the set of pages from presentation in the display area of the scrollable recommendation unit. For example, the scrollable recommendation unit presents an additional interface element in the display area proximate to a representation of a page in the set of pages. If the user interacts with the additional interface element, the representation of the page is removed from the scrollable recommendation unit and the page corresponding to the representation of the page is removed from the set of pages. The online system 140 also modifies the scrollable recommendation unit to present a representation of another page from the set of pages in the display area.

Example Display of Representations of Pages to a User

Figure 4:
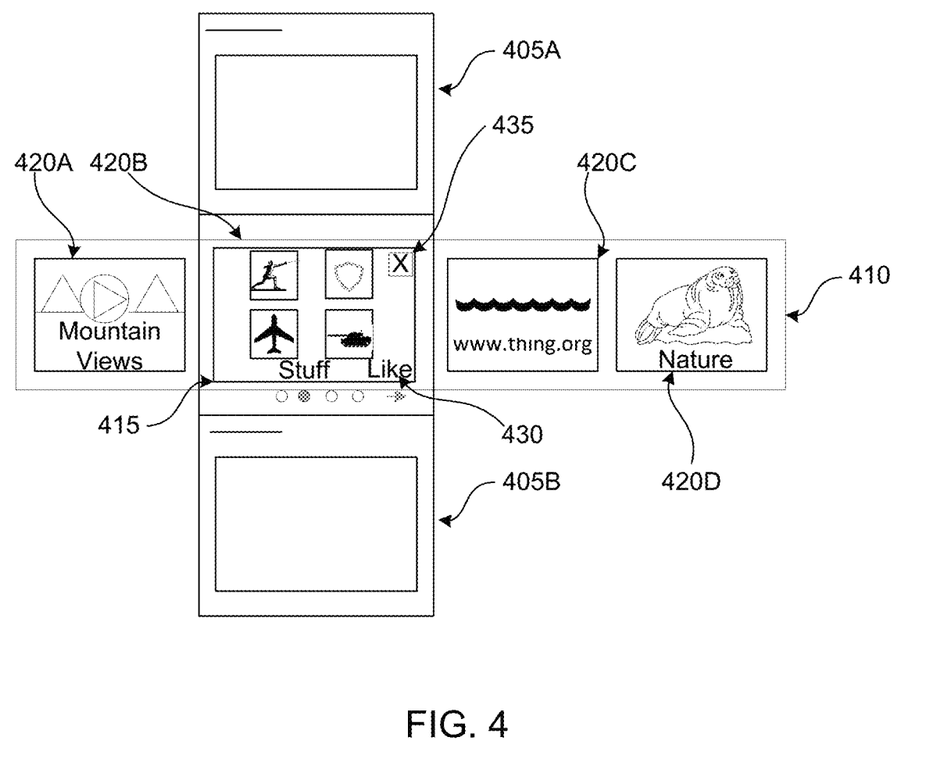
FIG. 4 is an example of presenting representations of pages of content to an online system user, in accordance with an embodiment.

FIG. 4 is an example of presenting representations of pages of content to an online system user. In the example of FIG. 4, the online system 140 presents a user with a feed 400 of content including multiple content items 405A, 405B selected by the online system 140 for display to the user. The feed 400 of content also includes a scrollable recommendation unit 410 including a display area 415 and representations 420A-420D of pages. In the example of FIG. 4, different representations 420A-420D of pages generated from content items including different types of content selected form different pages. Representation 420A includes a video obtained from a content item including video data selected from a page, while representation 420B includes images obtained from four content items including image data selected from another page. While representation 420B includes four images, in other embodiments, a representation including images may include images selected from any suitable number of content items selected form the page pages. Representation 420C includes a destination address from a content item selected from a page, and representation 420D includes an image associated with a page and stored by the online system 140. Additionally, each representation 420A-420C includes information identifying the page corresponding to the representation, such as a title or a name of the page maintained by the online system 140.

The example of FIG. 4 also shows an interface element 430 and an additional interface element 435 presented in the display area 415 proximate to representation 420B. When a user accesses interface element 430, the user indicates a preference for the page corresponding to representation 420B, so the online system 140 establishes a connection between the user and the page corresponding to representation 420B. As further described above in conjunction with FIG. 3, the online system 140 also identifies additional pages based on characteristics of the page corresponding to representation 420B, generates representations of the additional pages based on content items included on the additional pages, and includes the representations of the additional pages in the scrollable recommendation unit 410. The online system 140 also removes representation 420B from the scrollable recommendation unit 410 after establishing a connection between the page corresponding to representation 420B and the user.

In FIG. 4, when the user interacts with interface element 435, the online system 140 removes representation 420B from the scrollable recommendation unit 410 and presents another representation 420A, 420C, 420D in the display area 415. For example, the online system 140 modifies the scrollable recommendation unit 415 to present representation 420A in the display area 415. In other embodiments, the scrollable recommendation unit 415 is modified to present representation 420C, or any other representation of a page included in the scrollable recommendation unit 415, in response to the user accessing interface element 435. When providing the feed 405 of content to a client device 110 for presentation to the user, the online system 140 includes instructions for the client device 110 to modify the representation 420A-420D presented in the display area 415 of the scrollable recommendation unit 410 in response to user interactions with interface element 430 or interface element 425, as well as in response to other interactions by the user with the scrollable recommendation unit 410.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a nontransitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   maintaining, by an online system, a plurality of pages, each page including a feed of content items, each feed of content items comprised of one or more content items provided to the online system;
   identifying, by the online system, a set of pages of the plurality of pages based at least in part on characteristics of a user, the characteristics of the user maintained by the online system;
   selecting one or more content items from a feed of content items included on each page in the set of pages, the selecting based on types of content included in content items included on the page and amounts of interaction with the content items included on the page;
   generating a representation of each page in the set of pages, the representation of the page in the set including content from one or more of the selected content items included on the page and an identifier of the page;
   generating a scrollable recommendation unit comprising the representations of each page in the set of pages and a display area for presenting fewer than all of the representations of the pages in the set of pages at a time, the scrollable recommendation unit associated with one or more interactions for modifying the scrollable recommendation unit;
   sending the scrollable recommendation unit for presentation to the user within a feed of content items, the feed of content items comprised of one or more content items presented to the user; and
   responsive to receiving an interaction of the one or more interactions for modifying the scrollable recommendation unit, scrolling the scrollable recommendation unit in a direction orthogonal to an orientation of the feed of content items, the scrolling causing presentation of additional representations of pages in the set of pages to be presented in the display area.

2. The method of claim 1, wherein selecting one or more content items included on each page in the set of pages comprises:
   for each page in the set of pages:
   selecting a set of content items included on the page that includes one or more specific types of content;
   computing a score for each content item in the set of content items, the score for a content item included on the page based at least in part on a number of one or more specific interactions with the content item;
   selecting one or more content items from the set of content items based at least in part on the scores.

3. The method of claim 2, wherein selecting one or more content items from the set of content items included on the page based at least in part on the scores comprises:
   ranking the content items in the set of content items based at least in part on the scores; and
   selecting the one or more content items from the set of content items based at least in part on the ranking.

4. The method of claim 3, wherein selecting the one or more content items from the set of content items based at least in part on the ranking comprises:
   selecting content items having at least a threshold position in the ranking.

5. The method of claim 2, wherein selecting one or more content items from the set of content items included on the page based at least in part on the scores comprises:
   selecting one or more content items from the set having scores equaling or exceeding a threshold score.

6. The method of claim 2, wherein a specific type of content is selected from a group consisting of: image data, video data, a destination address, and any combination thereof.

7. The method of claim 1, wherein a type of content is selected from a group consisting of: video data, audio data, text data, image data, a destination address, and any combination thereof.

8. The method of claim 1, wherein generating the representation of each page in the set of pages comprises:
   retrieving content from a set of the content items selected from the page and including a specific type of content; and
   generating the representation of the page from the retrieved content.

9. The method of claim 8, wherein retrieving content from the set of the content items selected from the page and including the specific type of content comprises:
   retrieving video data from a set of the content items selected from the page and including video data.

10. The method of claim 8, wherein retrieving content from the set of the content items selected from the page and including the specific type of content comprises:
retrieving images from a set of the content items selected from the page and including image data.

11. The method of claim 10, wherein generating the representation of the page from the retrieved content comprises:
generating a representation of the page including a plurality of the retrieved images.

12. The method of claim 8, wherein retrieving content from the set of the content items selected from the page and including the specific type of content comprises:
retrieving a destination address from a content item selected from the page and including the destination address.

13. The method of claim 1, further comprising:
receiving an interaction of the one or more interactions for modifying the scrollable recommendation unit, the interaction indicating a preference for a representation of a page in the set of pages presented in the display area;
removing a page corresponding to the representation of the page in the set of pages presented in the display area from the set of pages;
including one or more additional pages in the set of pages based at least in part on characteristics of the page in the set of pages corresponding to the representation of the page in the set of pages presented in the display area;
generating representations of the one or more additional pages; and
modifying the scrollable recommendation unit to include the representations of one or more additional pages.

14. The method of claim 1, further comprising:
receiving an interaction of the one or more interactions for modifying the scrollable recommendation unit, the interaction removing a representation of a page in the set of pages presented in the display area;
removing a page corresponding to the representation of the page in the set of pages presented in the display area from the set of pages; and
modifying the scrollable recommendation unit to include a representation of an additional page in the set of pages.

15. A non-transitory computer readable medium configured to store instructions, the instructions when executed by a processor cause the processor to perform steps comprising:
maintaining, by an online system, a plurality of pages, each page including a feed of content items, each feed of content items comprised of one or more content items provided to the online system;
identifying, by the online system, a set of pages of the plurality of pages based at least in part on characteristics of a user, the characteristics of the user maintained by the online system;
selecting one or more content items from a feed of content items included on each page in the set of pages, the selecting based on types of content included in content items included on the page and amounts of interaction with the content items included on the page;
generating a representation of each page in the set of pages, the representation of the page in the set including content from one or more of the selected content items included on the page and an identifier of the page;
generating a scrollable recommendation unit comprising the representations of each page in the set of pages and a display area for presenting fewer than all of the representations of the pages in the set of pages at a time, the scrollable recommendation unit associated with one or more interactions for modifying the scrollable recommendation unit;
sending the scrollable recommendation unit for presentation to the user within a feed of content items, the feed of content items comprised of one or more content items presented to the user; and
responsive to receiving an interaction of the one or more interactions for modifying the scrollable recommendation unit, scrolling the scrollable recommendation unit in a direction orthogonal to an orientation of the feed of content items, the scrolling causing presentation of additional representations of pages in the set of pages to be presented in the display area.

16. The non-transitory computer readable medium of claim 15, wherein selecting one or more content items included on each page in the set of pages comprises:
for each page in the set of pages:
selecting a set of content items included on the page that includes one or more specific types of content;
computing a score for each content item in the set of content items, the score for a content item included on the page based at least in part on a number of one or more specific interactions with the content item;
selecting one or more content items from the set of content items based at least in part on the scores.

17. The non-transitory computer readable medium of claim 15, wherein generating the representation of each page in the set of pages comprises:
retrieving content from a set of the content items selected from the page and including a specific type of content; and
generating the representation of the page from the retrieved content.

18. The non-transitory computer readable medium of claim 17, wherein retrieving content from the set of the content items selected from the page and including the specific type of content comprises:
retrieving video data from a set of the content items selected from the page and including video data.

19. The non-transitory computer readable medium of claim 17, wherein retrieving content from the set of the content items selected from the page and including the specific type of content comprises:
retrieving images from a set of the content items selected from the page and including image data.

20. The non-transitory computer readable medium of claim 19 wherein generating the representation of the page from the retrieved content comprises:
generating a representation of the page including a plurality of the retrieved images.

21. The non-transitory computer readable medium of claim 17, wherein retrieving content from the set of the content items selected from the page and including the specific type of content comprises:
retrieving a destination address from a content item selected from the page and including the destination address.

* * * * *